United States Patent
Winslett

(10) Patent No.: US 6,176,523 B1
(45) Date of Patent: Jan. 23, 2001

(54) JOINT FOR VARIABLE WALL THICKNESS CONDUIT

(75) Inventor: Brian Winslett, Euclid, OH (US)

(73) Assignee: The Lamson & Sessions Co., Cleveland, OH (US)

( * ) Notice: Under 35 U.S.C. 154(b), the term of this patent shall be extended for 0 days.

(21) Appl. No.: 09/034,672

(22) Filed: Mar. 4, 1998

Related U.S. Application Data

(60) Provisional application No. 60/040,684, filed on Mar. 12, 1997.

(51) Int. Cl.$^7$ ..................................................... F16L 35/00
(52) U.S. Cl. ............................ 285/24; 285/110; 285/347; 285/374; 285/423; 285/910; 285/915; 405/184
(58) Field of Search ................................ 285/110, 24, 417, 285/347, 915, 374, 399, 423, 910; 403/335, 336, 339; 405/184

(56) References Cited

U.S. PATENT DOCUMENTS

| | | | |
|---|---|---|---|
| 1,209,374 | * 12/1916 | Andreolli | 285/374 |
| 1,663,228 | * 3/1928 | Zublin | 285/417 |
| 2,032,492 | 3/1936 | Nathan . | |
| 2,443,506 | * 6/1948 | Hohl et al. | 285/110 X |
| 2,615,740 | 10/1952 | Nathan . | |
| 2,809,853 | 10/1957 | Nathan . | |
| 3,809,412 | * 5/1974 | Glover | 285/110 |
| 3,998,478 | 12/1976 | Zopfi . | |
| 4,099,745 | 7/1978 | Cobbs . | |
| 4,279,425 | 7/1981 | Beacom . | |
| 4,552,485 | 11/1985 | Hammer . | |
| 4,565,381 | 1/1986 | Joelson . | |
| 4,641,858 | 2/1987 | Roux . | |
| 4,662,655 | 5/1987 | Fliervoet et al. . | |
| 4,664,421 | 5/1987 | Jones . | |
| 4,779,902 | 10/1988 | Lee . | |
| 4,796,669 | 1/1989 | St. Onge . | |
| 4,801,222 | 1/1989 | Fröhlich . | |
| 4,898,498 | 2/1990 | Akesaka . | |
| 4,958,959 | 9/1990 | St. Onge . | |
| 5,083,820 | 1/1992 | Hopperdietzel . | |
| 5,104,263 | 4/1992 | Shibahara et al. . | |
| 5,326,138 | * 7/1994 | Claes et al. | 285/110 |
| 5,547,230 | 8/1996 | Bank et al. . | |
| 5,782,500 | * 7/1998 | Mate | 285/24 |

FOREIGN PATENT DOCUMENTS

| | | | |
|---|---|---|---|
| 634612 | 1/1962 | (CA) . | |
| 1475807 | * 9/1969 | (DE) | 285/110 |
| 1415265 | * 9/1965 | (FR) | 285/110 |
| 1446644 | * 6/1966 | (FR) | 285/110 |
| 1216325 | 12/1970 | (GB) . | |

* cited by examiner

*Primary Examiner*—Dave W. Arola
(74) *Attorney, Agent, or Firm*—Jones, Day, Reavis & Pogue

(57) ABSTRACT

An improved joint for a variable wall thickness conduit is disclosed. The joint includes a female joint section and a male joint section. The female joint section has a body portion which terminates in a first support surface and a sealing sleeve which extends beyond the first support surface. The sleeve has a first sealing surface and a thickness. The male joint section has a body portion that terminates in a wall and a sealing nose that extends beyond the wall. The wall has a width greater than the thickness of the sleeve. The nose includes a load bearing surface, a second sealing surface and a recess in the second sealing surface. The female joint section aligns and joins to the male joint section, the load bearing surface being in force transmittal relationship with the first support surface, whereby a gap is formed between the first sealing surface and the second sealing surface. The sleeve also includes a locking member on the first sealing surface for resisting tensile forces between the female joint section and the male joint section. The joint also includes a sealing member which is at least partially retained within the recess and contacts the first sealing surface.

23 Claims, 2 Drawing Sheets

JOINT FOR VARIABLE WALL THICKNESS CONDUIT

This application claims the benefit under 35 U.S.C. 119(e) of U.S. Provisional Application Serial No. 60/040,684 filed Mar. 12, 1997.

FIELD OF THE INVENTION

The present invention relates to joints formed between pipe sections. More particularly, the present invention is an improved joint formed between plastic pipe sections particularly useful in microtunneling, sliplining, or pipe bursting applications, wherein the pipe sections have a variable wall thickness.

BACKGROUND OF THE INVENTION

Pipes that contain and transport water are used in numerous applications, which are generally divided into the broad categories of non-pressure and pressure applications. The present invention is useful for pipes suitable for both non-pressure and pressure applications, and is particularly usefil in sewage and drain pipes. Other applications for the present invention are also contemplated, such as conduit sections used for housing telecommunications cable, fiber optics cable, and electrical wire or cable.

Pipe can be installed in a number of ways, one of which is the traditional pipe laying technique of simply digging a trench and then placing the pipe sections in the trench, assembling the sections into a pipeline and then covering the pipeline. There are also trenchless pipe installation methods known as microtunneling, sliplining, and pipe bursting, which are described below. The present invention can be used in traditional applications, and is particularly useful in trenchless applications.

Microtunneling is a process in which a vertical access shaft is excavated to the pipe's starting grade. The term starting grade means the level or depth at which the pipe will be installed. A second vertical access shaft is constructed at the ending location for the pipeline. The pipeline is installed between the two vertical shafts. A microtunneling machine, which is usually a remotely controlled, steerable, boring machine having a cutter head at one end, is lowered into the first access shaft. The microtunneling machine bores or cuts through the wall of the shaft and the cutter head drills a tunnel through the soil towards the second access shaft. The soil that is displaced by the cutter head is removed either by an auger system, by which the soil is mechanically removed from the hole, or a slurry system, which uses water to flush the loose soil from the hole.

Before the entire microtunneling machine exits the access shaft and enters the tunnel, a pipe section is attached to the rear of the machine. Axial compressive force or pressure, directed along the longitudinal axis of the pipe section, is applied to the end of the pipe section opposite the machine. This force pushes the machine forward, with the pipe section attached, into the tunnel towards the second shaft. A second pipe section is attached to the first, then a third is attached to the second, and so on. This process of adding additional pipe and pushing the machine forward continues until the machine enters the second access shaft. At that point, an entire length of pipe, consisting of a plurality of pipe sections, exists between the access shaft and the second shaft. The machine is then disconnected from the pipe and the pipeline is complete.

During the tunneling process, the machine is advanced forward by pushing against the end of the last pipe section attached and transmitting the axial compressive force through the connected pipe sections. Therefore, the pipe sections must be joined in a manner such that a significant amount of axial compressive force can be transmitted through the joints without buckling or otherwise damaging the joints or the pipe sections. Furthermore, the tunnel formed by the microtunneling machine is preferably just slightly larger than the diameter of the pipe because the larger the diameter of the tunnel, the greater the chance that the tunnel will collapse. If the pipe joints include sections that project outward from the diameter of the pipe wall, a larger tunnel must be bored to accommodate the pipe joints, thereby creating a greater risk that the tunnel will collapse. Therefore, it is important that the pipeline have a smooth outer surface.

Sliplining is a method of rehabilitating deteriorated pipelines by inserting a new, smaller diameter pipe, called a slipliner pipe, inside of an existing larger-diameter pipe. When sliplining, an access pit is dug to an existing pipeline, the access pit being slightly longer than the length of one section of the slipliner pipe. The top half of the section of existing pipe is exposed at the bottom of the access pit, and is removed leaving the bottom pipe half, known as a pipe cradle. A slipliner pipe section is then placed inside the pipe cradle and is pushed into the existing pipe, parallel to the longitudinal axis of the existing pipe. A second slipliner pipe section is then lowered into the pipe cradle and joined to the first section. The second pipe section is then pushed into the existing pipe causing the first pipe section to advance further into the existing pipeline. Additional pieces of pipe are joined, and the assembled pipe is advanced until the existing pipeline is completely sliplined or until the next access pit is reached. When the sliplinig is complete, grout or other sealing material is pumped into the gap between the existing pipe and the new pipe along the entire length of existing pipe that was sliplined.

Often, the existing pipe to be sliplined is broken and dilapidated. The existing pipe's joints are sometimes separated, and pieces of debris or sections of the existing pipe extend into the pipe cavity creating obstructions. Furthermore, if the slipliner pipe were to have flared or wide joints, the slipliner pipe inserted into the existing pipe will have a relatively small diameter as compared to the existing pipe and therefore may not be capable of transporting a large enough volume of liquid. Therefore, it is important that a slipliner pipe have a smooth outer surface. Additionally, slipliner pipe sections also must be capable of efficiently transferring an axial compressive force from one slipliner pipe section to another without buckling or failing at the pipe joint.

Pipe bursting is another method of pipeline rehabilitation in which the existing pipe is replaced by a pipe having a diameter equal to or larger than the existing pipe. In this method, access is first gained to an existing pipe through a manhole or access pit. A small diameter steel pipe is inserted through the existing pipeline to a second access location. A pipe bursting head, which is generally a solid metal cone, is then attached to the steel pipe at the second access pit. The steel pipe with the pipe bursting head is then retracted towards the first access location by pulling the steel pipe. As the bursting head is pulled through the existing pipe, the existing pipe bursts into pieces that are displaced into the soil. A new pipe is pulled behind the pipe bursting head and creates a new pipeline. Pipe bursting creates numerous snags or obstructions, which are usually pieces of broken existing pipe. Therefore, it is important that the outer surface of the new pipe be smooth and have no projections.

A joint for use in the applications described above is disclosed in commonly-assigned U.S. Pat. No. 5,547,230, which is incorporated here by reference. The joint disclosed therein generally solved the problem of providing a substantially smooth outer surface in a pipeline made up of pipe sections having a variable wall thickness. It has proven successful for use in many microtunneling, sliplining, and pipe bursting applications. The present invention is an improvement over the joint disclosed in the '230 patent and is particularly suited for applications in which axially compressive and tensile forces are unusually great.

Many prior-art joint structures have a propensity to fail when exposed to unusually high, axial compressive forces often associated with microtunneling, sliplining, and pipe bursting, as well as tensile forces encountered during use that would tend to pull the joint apart. When exposed to those forces, joints have had a tendency to fail. In particular, prior-art joints contain a small gap that, generally, has faced the inner diameter ("ID") to achieve a smoother outer wall. When unusually high compressive forces are applied, the pipe and corresponding pipe joint have a tendency to buckle outward. When the gap faces the ID, there is no mechanism or structure to contain outward buckling. Thus, pipe joints have failed due to outward buckling of the joint when exposed to unusually high axial compressive forces, or the pulling apart of the joint when exposed to strong tensile forces.

Prior-art structures on occasion also have encountered problems with installation and repair. When the compressive forces are applied, the gaskets can slip or deform out of place, thereby preventing an adequate water-tight seal at the joint.

The present invention solves these and other problems associated with prior-art pipe joints.

DETAILED DESCRIPTION OF THE PREFERRED EMBODIMENTS

Figure 1:
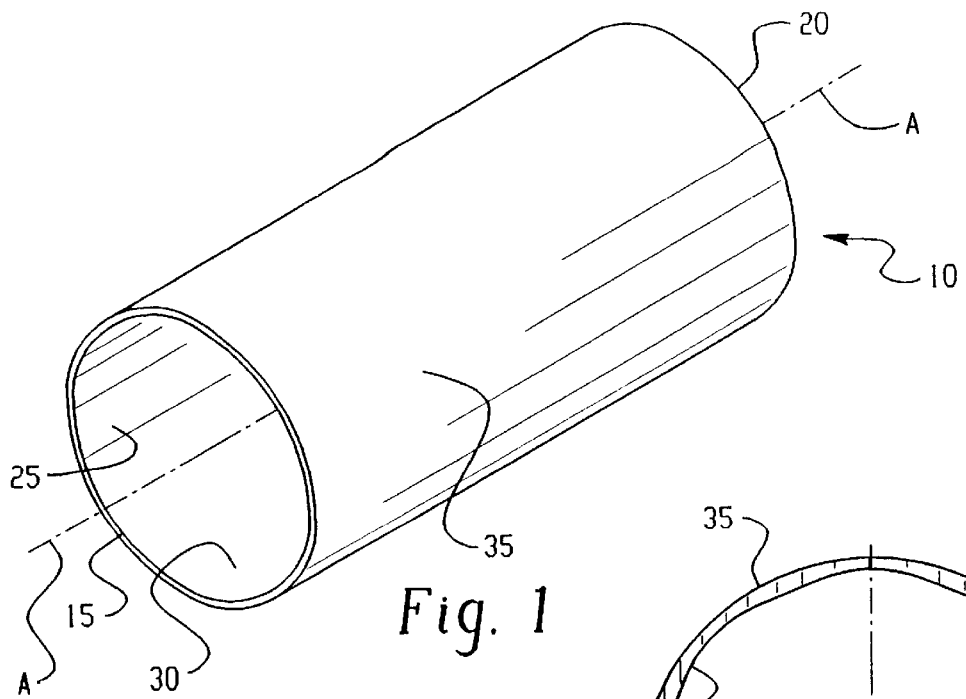
FIG. 1 is a perspective view of a pipe section in accordance with the present invention.

Referring now to the drawings whose purpose is to illustrate a preferred embodiment of the invention and not to limit the same, FIG. 1 shows a pipe or conduit section 10 preferably formed of extruded PVC or polyethylene, although other materials such as metals may be used. The extrusion process used to form pipe section 10 is well known by those skilled in the art. Generally, the extrusion process begins by introducing plastic resin into an extruder where the material is heated, softened, and forced through a die to form the pipe shape. The extruded pipe is then partially cooled in a water bath using a pulling device that pulls the extruded pipe from the die through the water bath.

Normal production speeds for pipe made in pipe-extrusion operations range between 300 and 3500 lbs/hr depending upon the pipe size being manufactured. Preferred nominal pipe sizes (the term nominal meaning the target manufacturing dimension) produced in a standard manufacturing process vary between 4" and 36" in outer diameter ("OD"), and between 0.200" and 2.000" in wall thickness, although other pipe sizes could be used. As understood by those skilled in the art, however, the outer dimension, the inner dimension, and the shape or roundness of the pipe, may vary within a given range known as the manufacturing tolerance. Pipe section 10 has a female end 15, a male end 20, and an annular wall 25 having an inner surface 30 and an outer surface 35.

Figure 2:
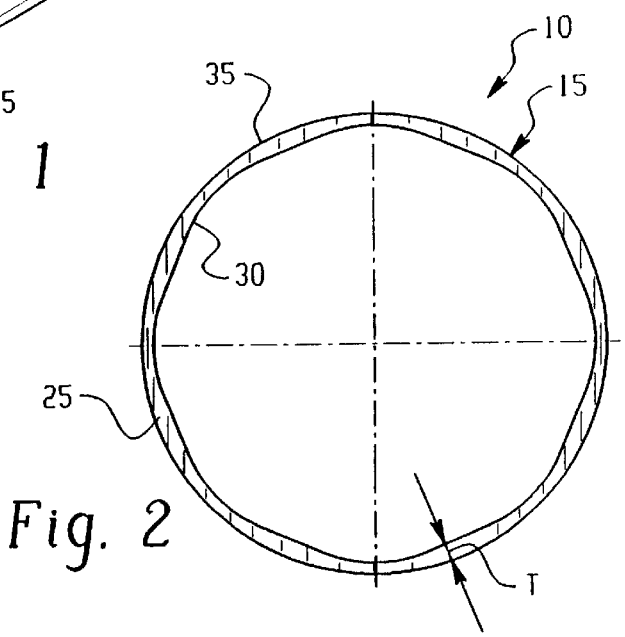
FIG. 2 is an end view of the pipe shown in FIG. 1, presenting an exaggerated view of a variable thickness wall.

Referring now to FIG. 2, female end 15 of pipe section 10 is shown. A thickness T of wall 25 is defined between inner surface 30 and outer surface 35. FIG. 2 intentionally exaggerates the variation in wall thickness of pipe section 10 so as to make the problem clear to the reader. The actual tolerances in wall thickness typically vary from ±0.020" to ±0.060", depending upon the nominal thickness of annular wall 25. For example, in a 36" OD pipe having a nominal wall thickness of greater than 1", the manufacturing tolerance is plus or minus 0.060". The manufacturing tolerances are usually smaller for pipe sections having a smaller OD and a smaller wall thicknesses.

As shown in FIG. 2, the thickness of wall 25 varies because of the manufacturing tolerances of surfaces 30 and 35. As it will be appreciated by those skilled in the art, the roundness of pipe section 10 also can vary within the manufacturing tolerances so the pipe can be slightly oblong or egg-shaped. Furthermore, inner surface 30, as shown in FIG. 2, is not perfectly symmetrical so the wall thickness T varies not only from pipe section to pipe section, but also across the circumference of any given cross section.

Figure 3:
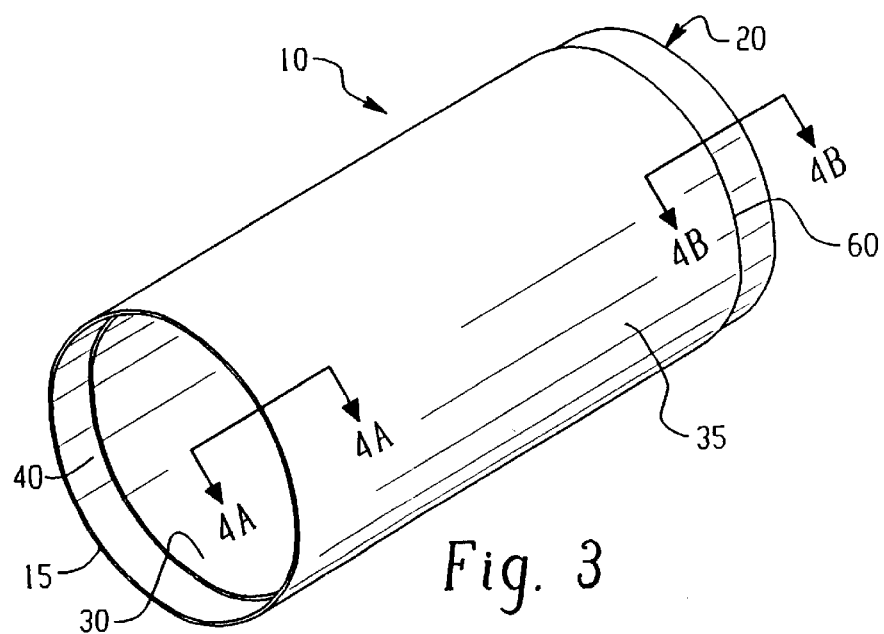
FIG. 3 is a perspective view of the pipe section shown in FIG. 1 after joint members have been formed in the ends.
Figure 4A:
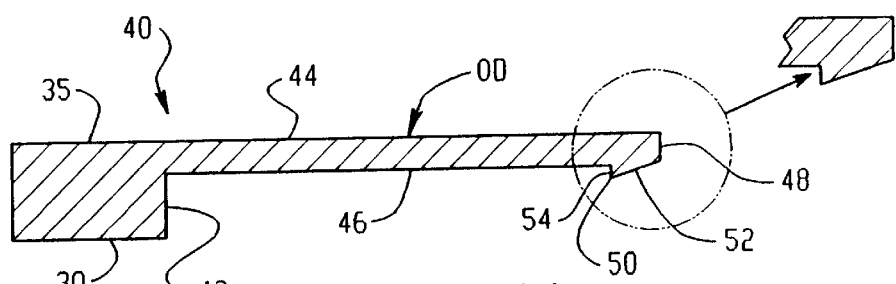
FIG. 4A an enlarged cross sectional view taken along line 4A—4A of FIG. 3.
Figure 4B:
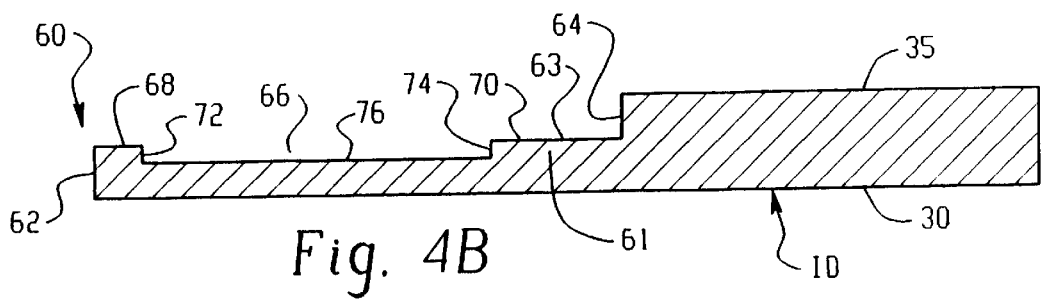
FIG. 4B is an enlarged cross sectional view taken along line 4B—4B of FIG. 3.

FIGS. 3, 4A and 4B show a pipe section 10 after being machined to form joint members at each respective end. Female end 15 has a female joint member 40. Joint member 40 has a first support surface 42 formed therein. Surface 42 is annular, extending about the entire periphery of wall 25. Support surface 42 also is preferably planar in the direction perpendicular to the longitudinal axis A of pipe section 10. However, surface 42 could also be formed at an angle and have a surface other than planar. Surface 42 could be formed by a router, lathe, or similar tool. Optionally, surface 42 could be created by heat forming techniques in which pipe section 10 is heated and formed on a mold.

A sealing sleeve 44 is formed adjacent outer surface 35. Sleeve 44 extends outwardly from surface 42 and also is annular, extending about the periphery of outer surface 35. A sealing surface 46 is formed on sleeve 44 opposite outer surface 35. As shown in FIG. 4A, the width of sleeve 44 is measured between sealing surface 46 and outer surface 35. In a preferred embodiment, the nominal thickness of sleeve 44 is 0.150". In a preferred embodiment, sleeve 44 has a nominal length of 2.500". An end 48 is formed in sleeve 44. Sleeve 44 also contains locking lip 50. Locking lip 50 includes surface 52 that slants slightly from end 48 to form lip 54. In the preferred embodiment, lip 54 is located approximately 0.250" from end 48 and has a depth of 0.060" from the inner surface of sleeve 44.

Turning now to FIG. 4B, male end 20 has a male joint member 60. Male joint member 60 has a load bearing surface 62 formed adjacent to inner surface 30. Load bearing surface 62 is preferably planar in the direction perpendicular to the longitudinal axis A of pipe section 10, although other surface configurations could be used. Load bearing surface 62 has a variable width or thickness.

Wall 64 is formed adjacent outer surface 35 and perpendicularly thereto. A sealing nose 61 is formed adjacent inner surface 40. Nose 61 extends outwardly from wall 64 and also is annular, extending about the periphery of inner surface 30. A second sealing surface 63 is formed on nose 61 opposite inner surface 30. Nose 61 also defines recess 66 in which a gasket or other sealing element 80 is placed. Recess 66 is specifically defined by first ledge 68 adjacent and perpendicular to load bearing surface 62, second ledge 70 adjacent and perpendicular to wall 64, second and third walls 72, 74 perpendicular to the first and second ledges respectively, and gasket seat 76. Recess 66, ledges 68 and 70, and walls 72 and 74, collectively form second sealing surface 63. In the preferred embodiment, the first and second ledges have dimensions 0.250" and 0.650", respectively, the second and third walls are both 0.090" in depth, and the gasket seat has width of 1.750".

The joint members of the present invention are manufactured as follows. After the pipe is formed, it is cut into individual sections by a sawing device. Simultaneously, a router attached to the sawing device cuts away some of the material on outer surface 35 of the pipe to form the male joint member as the pipe is manufactured. The router is guided by outer surface 35 of pipe section 10, which enables the tool to form a uniform or constant width profile in wall 25. The sawing device, router, and method of guiding by tracking the outer surface of the pipe section are all known to those skilled in the art. Alternatively, the male joint member can be cut using other devices known in the art, such as a lathe. Female joint member 40 is preferably formed at a separate station in the manufacturing process after male joint member 60 has been formed. Like male joint member 60, female joint member 40 can be formed using a router, lathe, or similar cutting apparatus known in the art. A preferred method that can be used to form the joint members is disclosed in commonly-assigned U.S. Pat. No. 5,547,230.

Figure 5:
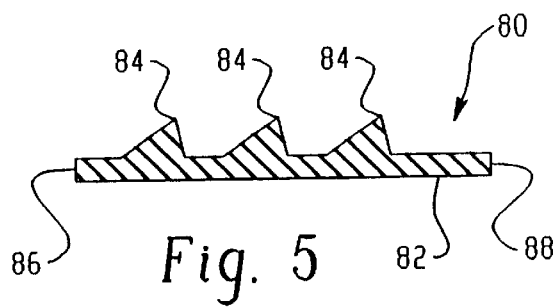
FIG. 5 is a cross sectional view of a preferred sealing member for use in the invention.

FIG. 5 shows a preferred gasket or sealing element 80 for use in the present invention, although numerous configurations and materials could be used. Gasket 80 is positioned within the joint of the present invention extending around the joint's entire circumference. Gasket 80 is preferably formed of polyisoprene, EPDM rubber, neoprene, PVC or any suitable material. Gasket 80 has a generally planar base 82, and preferably a plurality of sealing ribs 84 opposite the base. Gasket 80 also has first end 86 and second end 88. Gasket 80 is preferably adhered to gasket seat 76 or mechanically locked into place to improve its retention therein although it does not have to be adhered therein. In this application, adherence and mechanically locking into place are synonymous. Alternative methods of adhering gasket 80 to gasket seat 76 include applying a substance such as glue to planar base 82, applying an adhesive strip to planar base 82, or using some type of mechanical restraining means, such as a banded strap, hose clamp, clips, or a mechanical recess to retain gasket 80. In the preferred embodiment, gasket 80 is adhered to gasket seat 76 by means of glue.

Figure 6:
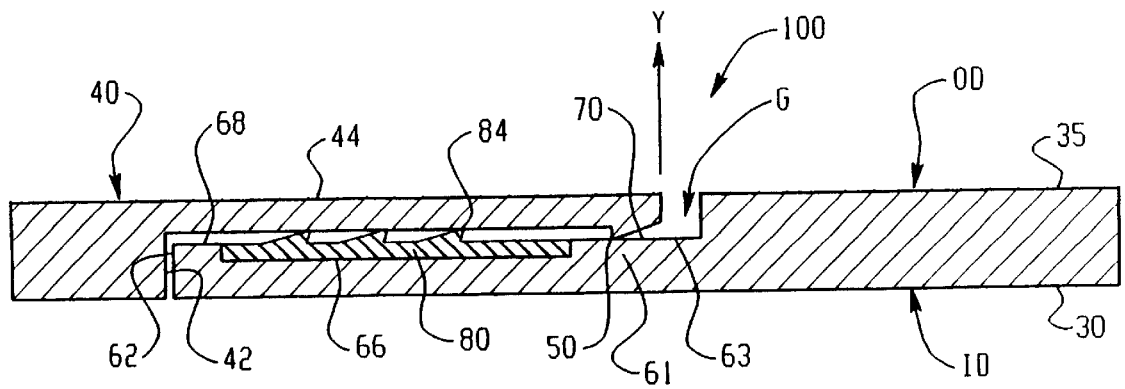
FIG. 6 is an enlarged cross sectional view of a first joint member joined to a second joint member, in accordance with the present invention.

FIG. 6 shows female joint member 40 joined with a male joint member 60, and a gasket 80 therebetween disposed within recess 66, to form joint 100. When joined, first support surface 42 is in contact with load bearing surface 62 in a force-transmitting relationship. Sleeve 44 is positioned generally above ledges 68 and 70 with locking lip 50 resting on ledge 70 of male joint member 60, with gasket 80 disposed therebetween.

The operation and advantages of the joint of the present invention can best be understood by reference to FIG. 6. In operation, axial compressive forces are transmitted from one pipe section to another through support surface 42 and load bearing surface 62 in joint 100. When the axial compressive forces become too excessive, the observed mode of failure for a pipe joints has been the outward buckling of the pipe joint in the Y direction as indicated by the arrow in FIG. 6. A primary advantage of the present invention is its improved resistance to buckling in response to unusually high axial compressive forces.

For many applications, prior-art joints are able to withstand axial compressive forces. However, in certain applications where the axial compressive forces are unusually high, such as in microtunneling applications, the joint was prone to failure due to its inability to contain outward buckling. In prior-art joints having a sealing sleeve on the female joint member and a sealing nose on the male joint member, the sealing sleeve was made longer than the sealing nose, thus causing a gap to be formed facing the ID and a smooth surface on the OD when a female member was joined to a male member to form a pipe joint. This arrangement was thought to facilitate pipe installation. The axial compressive forces subject on the joint were, therefore, transmitted to the sealing sleeve and not to the sealing nose since the sealing sleeve was longer than the sealing nose. It has been found, however, that extremely high axial compressive forces tend to cause the joint to buckle outward. There was nothing to restrain the sealing sleeve from buckling because it was the outer most portion of the pipe joint. Thus the axial compressive forces that the joint could withstand were limited to the level of forces the sealing sleeve could withstand without buckling.

As shown in FIG. 6 in the present invention, the problem of buckling encountered when the axial compressive forces are unusually high is solved by making sealing nose 61 longer than sealing sleeve 44, the opposite of what is taught by the prior-art. Because sealing nose 61 is longer than the sealing sleeve 44, a gap is formed adjacent the OD instead of the ID, as in the prior-art joints, and sealing nose 61 instead of sealing sleeve 44 is exposed to the axial compressive forces subject on pipe joint 100. This arrangement leads to greater resistance to failure or outward buckling ofjoint 100 than that of the prior art joints. When the axial compressive forces subject on joint 100 reach a level that could cause sealing nose 61 to begin to buckle outwardly, sealing sleeve 44 serves to support sealing nose 61 and restrain any outward buckling of sealing nose 61. Thus, pipe joint 100 of the present invention can withstand much higher axial compressive forces than the prior art joints. It has been observed that the pipe joint of the present invention can withstand twice the axial compressive forces that the prior art joints can withstand due to its improved arrangement. In addition, having the gap face the OD increases the smoothness of the ID. This decreases the resistance to flow in the pipeline, thereby improving pipeline performance.

An additional advantage provided by the present invention is in its improved resistance to tensile forces in the opposite direction that would tend to pull the joint apart. When this occurs, locking lip 50 catches on the last of the sealing ribs 84 of gasket 80 to prevent the joint from pulling apart. Thus, the joint of the present invention has the advantage of preventing failure due to tensile forces better than prior-art joint structures. Note, however, that the joint can be pulled apart intentionally with a wiggling radial motion to remove pipe sections for repair and replacement.

Furthermore, since the gasket rests in recess 66, the gasket will not slip or deform during installation, as can occur in prior-art pipe joints.

Having thus described preferred embodiments of the invention, other variations and embodiments that do not depart from the spirit of the present invention will become readily apparent to those skilled in the art. The scope of the present invention is thus not limited to any one particular embodiment.

What is claimed is:

1. A conduit section comprising:
   a female end having a body portion which terminates in a first support surface and having a sealing sleeve extending beyond said first support surface, said sleeve having a first cylindrical inner sealing surface, said sleeve having a thickness;
   a male end having a body portion which terminates in a wall and having a sealing nose extending beyond said wall, said nose having a load bearing end surface and a second cylindrical outer sealing surface, said nose having a recess in said second sealing surface, said wall having a width greater than the thickness of said sleeve;
   said female end being configured to align with and join to a male end of a second conduit section, said male end being configured to align with and join to a female end of a third conduit section, said nose having a length greater than the length of said sleeve such that a gap is formed between the end of the sleeve of said third conduit section and the wall of said male end and the end of the sleeve of said third conduit section and the wall of said male joint end are free of axially compressive load when said male end is joined to said female end of said third conduit section; and
   further comprising a sealing member that is at least partially retained within said recess and wherein said sleeve includes a locking member on said first sealing surface, said locking member including a projection that extends radially beyond said first sealing surface and that cooperates with said sealing member to resist tensile forces when said female end is joined to said male end of said second conduit.

2. A conduit section according to claim 1 which is composed of plastic.

3. A conduit section according to claim 2 wherein said plastic is PVC.

4. A conduit section according to claim 1 wherein said first support surface and said load bearing surface are planar.

5. A conduit section according to claim 1 wherein said conduit has a longitudinal axis and said first support surface and said load bearing surface are each formed perpendicular to said longitudinal axis.

6. A conduit section according to claim 1 wherein said recess is defined by a first ledge adjacent and perpendicular to said load bearing surface, a second ledge adjacent and perpendicular to said wall, a second and third wall perpendicular to said first and second ledges, and a gasket seat.

7. A conduit section according to claim 1 wherein said sealing member has at least one rib, said rib contacting said first sealing surface when said male end joins to said female end of said third conduit section.

8. A conduit section according to claim 7 wherein said rib cooperates with said locking member for resisting said tensile forces.

9. A conduit section according to claim 1 wherein said sealing member is a gasket.

10. A conduit section according to claim 1 wherein said sealing member includes adhesive means for adhering said sealing means to said sealing surface.

11. A conduit section according to claim 1 wherein said locking member includes a surface that extends at an angle from the end of said sleeve.

12. A conduit section according to claim 1 wherein said locking member is formed integral with said first sealing surface.

13. A joint formed between two sections of conduit comprising:
    a female joint section having a body portion that terminates in a first support surface and having a sealing sleeve extending beyond said first support surface, said sleeve having a first cylindrical inner sealing surface, said sleeve having a thickness;
    a male joint section having a body portion that terminates in a wall and having a sealing nose extending beyond said wall, said wall having a width greater than the thickness of said sleeve, said nose having a load bearing end surface and a second cylindrical outer sealing surface, said nose having a recess in said second sealing surface;
    said female joint section being configured to align with and join to said male joint section, said load bearing surface being in force transmittal relationship with said first support surface, said nose having a length greater than the length of said sleeve such that a gap is formed between the end of said sleeve and the wall of said male joint section and the end of said sleeve and the wall of said male joint section are free of axially compressive load when said female joint section and said male joint section are joined; and
    a sealing member at least partially retained within said recess, said sealing member contacting said first sealing surface; and
    where said sleeve includes a locking member on said first sealing surface, said locking member including a projection that extends radially beyond said first sealing surface and that cooperates with said sealing member to resist tensile forces when said female end and said male end are joined.

14. A conduit joint according to claim 13 wherein said first support surface and said load bearing surface are planar.

15. A conduit joint according to claim 13 wherein said conduit sections have a longitudinal axis and said first support surface and said load bearing surface are each formed perpendicular to said longitudinal axis.

16. A conduit joint according to claim 13 wherein said sealing member has at least one rib, said rib contacting said first sealing surface.

17. A conduit joint according to claim 16 wherein said rib cooperates with said locking member for resisting said tensile forces.

18. A conduit joint according to claim 13 wherein said sealing member is a gasket.

19. A conduit joint according to claim 18 wherein said sealing member includes adhesive means for adhering said sealing means to said sealing surface.

20. A conduit joint according to claim 13 wherein said recess is defined by a first ledge adjacent and perpendicular to said load bearing surface, a second ledge adjacent and perpendicular to said wall, a second and third wall perpendicular to said first and second ledges, and a gasket seat.

21. A joint according to claim 13 wherein said locking member includes a surface that extends at an angle from the end of said sleeve.

22. A joint according to claim 13 wherein said locking member is formed integral with said first sealing surface.

23. A joint formed between two sections of conduit comprising:
    a female joint section having a body portion that terminates in a first support surface and having a sealing sleeve extending beyond said first support surface, said sleeve having a first cylindrical inner sealing surface, said sleeve having a thickness;

a male joint section having a body portion that terminates in a wall and having a sealing nose extending beyond said wall, said wall having a width greater than the thickness of said sleeve, said nose having a load bearing end surface and a second cylindrical outer sealing surface, said nose having a recess in said second sealing surface;

said female joint section being configured to align with and join to said male joint section, said load bearing surface being in force transmittal relationship with said first support surface, said nose having a length greater than the length of said sleeve such that a gap is formed between the end of said sleeve and the wall of said male joint section and the end of said sleeve and the wall of said male joint section are free of axially compressive load when said female joint section and said male joint section are joined; and a sealing member at least partially retained within said recess, said sealing member contacting said first sealing surface; and wherein said recess is defined by a first ledge adjacent and perpendicular to said load bearing surface, a second ledge adjacent and perpendicular to said wall, a second and third wall perpendicular to said first and second ledges, and a gasket seat.

\* \* \* \* \*